UNITED STATES PATENT OFFICE 1,938,180

PROCESS FOR THE MANUFACTURE OF ORGANIC METALLO COMPOUNDS

Herbert Peter Augustus Groll, Berkeley, Calif., assignor to Shell Development Company, San Francisco, Calif., a corporation of Delaware No Drawing. Application June 23, 1931
Serial No. 546,425

18 Claims. (Cl. 260—11)

The invention is concerned with the treatment of a metal salt with an organo alkali-metal compound wherein one or more organic radicals of the organo alkali-metal compound replace one or more acid radicals of the metal salt.

I have found that organo alkali-metal compounds can be simply and easily utilized as means for introducing an organic radical into a metal salt, regardless of whether the metal salt already contains one or more organic radicals. In other words, my process can be practiced generally with metal salts of the type:

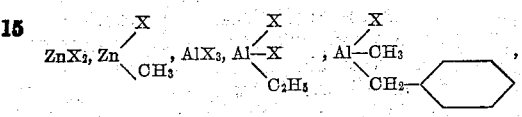 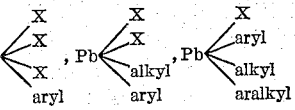

etc., wherein X represents an acid radical, as long as the metal salt contains at least one available acid radical which can be replaced by the organic radical of the organo alkali-metal compound. The valence of the metallic constituent of the metal salt does not present any difficulty in the successful practice of my process. Mono- and polyvalent metal salts may be used. My process is not dependent on the nature of the organic radicals which may be contained in the metal salt. The organic radicals may be aliphatic or aromatic in character. Although the invention can be practiced with any metal salt, I have found it preferable to work with metal halides (substituted or not) as the reaction proceeds more smoothly with them.

Although any organo alkali-metal compound may be employed to effect the desired reaction, in practice, I have found it preferable to utilize the organo-compounds of lithium as the metal appears to facilitate the reaction with more ease than the corresponding organo-compounds of the other alkali-metals. The character of the organic radical contained in the organo alkali-metal compound is best determined by the organic radical desired to be introduced in the metal salt; it may be of alkyl, aralkyl or aryl character.

The proportion of reactants to be used is determined by the nature and structure of the metal salt and the number of organic radicals desired to be introduced therein.

Auxiliary agents may be used to facilitate the reaction. Suitable solvent and suspension media may be utilized to promote greater surface contact of the reactants.

For illustrative purposes only, I will describe my process as practiced with thallium diethyl chloride and lead tetrachloride.

Example 1

33 gm. of thallium diethyl chloride were put into a 200 c. c. bulb. Enough dry petroleum ether of 30°-50° C. boiling range was added to cover the compound and to expel any air from the compound. The air in the bulb was displaced by a stream of nitrogen and the bulb inserted in a freezing mixture to prevent reaction during the addition of lithium ethyl. 6 gms. of lithium ethyl were added to the thallium compound. Lithium ethyl is sparingly soluble in petroleum ether. 150 c. c. of petroleum ether were added and the bulb sealed. The bulb was then shaken rapidly with constant cooling until no further heat was evolved. The shaking was continued until most of the thallium diethyl chloride had disappeared. The bulb was opened and the clear yellow solution of thallium triethyl filtered from the lithium chloride powder which had been formed. The petroleum ether was evaporated from the filtered solution leaving thallium triethyl which may be further purified by distillation under vacuum.

Example 2

24 gms. of thallium diethyl chloride was placed in a bulb and covered with dry ether. The air was displaced by dry nitrogen and 1070 c. c. of a 0.075 normal solution of triphenyl methyl sodium in ether were added and the bulb sealed. The mixture was shaken until the red color of the triphenyl methyl sodium had disappeared. The product was filtered and the ether evaporated from the triphenyl methyl thallium diethyl formed.

Example 3

350 gm. anhydrous lead tetra chloride were placed in a two liter bulb provided with a reflux condenser and 1000 c. c. of dry petroleum ether added. The air in the bulb was displaced by a stream of nitrogen and the bulb cooled with ice. 144 gm. of lithium ethyl were added carefully in small portions with frequent shaking of the bulb while the stream of nitrogen was being maintained. The reaction proceeds immediately and is completed by agitating the bulb for a few hours. After separation of the insoluble lithium chloride, the petroleum ether is evaporated off the lead tetra ethyl formed. The latter may be purified by distillation.

While I have in the foregoing described in some detail the preferred embodiment of my invention and some variants thereof, it will be understood that this is only for the purpose of making the invention more clear and that the invention is not to be regarded as limited to the details of operation described, nor is it dependent upon the soundness or accuracy of the theories which I have advanced as to the reasons for the advantageous results attained. On the other hand, the invention is to be regarded as limited only by the terms of the accompanying claims, in which it is my intention to claim all novelty inherent therein as broadly as is possible in view of the prior art.

I claim as my invention:

1. A process for the synthesis of an organo metallo compound wherein an acid radical of a metal salt is displaced which comprises reacting a metal halide whose metallic radical is different from the alkali-metal radical of the other reactant with an alkali-metal compound wherein the alkali-metal is directly linked to an alkyl group which may be further substituted.

2. A process for the synthesis of an organo metallo compound wherein an acid radical of a metal salt is displaced which comprises reacting a metal halide whose metallic radical is different from the alkali-metal radical of the other reactant with an alkyl alkali-metal compound.

3. A process for the synthesis of an organo metallo compound wherein an acid radical of a metal salt is displaced which comprises reacting a metal halide whose metallic radical is different from the alkali-metal radical of the other reactant with an aralkyl alkali-metal compound wherein the alkali-metal is directly linked to the alkyl group.

4. A process for the synthesis of an organo metallo compound wherein an acid radical of a metal salt is displaced which comprises reacting a metal halide whose metallic radical is different from the alkali-metal radical of the other reactant with a lithium compound wherein lithium is directly linked to an alkyl group which may be further substituted.

5. A process for the synthesis of an organo metallo compound wherein an acid radical of a metal salt is displaced which comprises reacting a metal halide whose metallic radical is different from the alkali-metal radical of the other reactant with an alkyl lithium compound.

6. A process for the synthesis of an organo metallo compound wherein an acid radical of a metal salt is displaced which comprises reacting a metal halide whose metallic radical is different from the alkali-metal radical of the other reactant with an aralkyl lithium compound wherein the alkali-metal is directly linked to the alkyl group.

7. A process for the synthesis of an organo metallo compound wherein an acid radical of a metal salt is displaced which comprises reacting an organic metallo halide whose metallic radical is different from the alkali-metal radical of the other reactant with an alkali-metal compound wherein the alkali-metal is directly linked to an alkyl group which may be further substituted.

8. A process for the synthesis of an organo metallo compound wherein an acid radical of a metal salt is displaced which comprises reacting an organic metallo halide whose metallic radical is different from the alkali-metal radical of the other reactant with an alkyl alkali-metal compound.

9. A process for the synthesis of an organo metallo compound wherein an acid radical of a metal salt is displaced which comprises reacting an organic metallo halide whose metallic radical is different from the alkali-metal radical of the other reactant with an aralkyl alkali-metal compound wherein the alkali-metal is directly linked to the alkyl group.

10. A process for the synthesis of an organo metallo compound wherein an acid radical of a metal salt is displaced which comprises reacting an organic metallo halide whose metallic radical is different from the alkali-metal radical of the other reactant with a lithium compound wherein lithium is directly linked to an alkyl group which may be further substituted.

11. A process for the synthesis of an organo metallo compound wherein an acid radical of a metal salt is displaced which comprises reacting an organic metallo halide whose metallic radical is different from the alkali-metal radical of the other reactant with an alkyl lithium compound.

12. A process for the synthesis of an organo metallo compound wherein an acid radical of a metal salt is displaced which comprises reacting an organic metallo halide whose metallic radical is different from the alkali-metal radical of the other reactant with an aralkyl lithium compound wherein lithium is directly linked to the alkyl group.

13. A process for the synthesis of an organo metallo compound wherein an acid radical of a metal salt is displaced which comprises reacting a metal halide with an alkali-metal compound wherein the alkali-metal is directly linked to an alkyl group which may be further substituted.

14. A process for the synthesis of an organo metallo compound wherein an acid radical of a metal salt is displaced which comprises reacting a metal halide with a lithium compound wherein lithium is directly linked to an alkyl group which may be further substituted.

15. A process for the synthesis of an organo metallo compound wherein an acid radical of a metal salt is displaced which comprises reacting an organic metallo halide with an alkali-metal compound wherein the alkali-metal is directly linked to an alkyl group which may be further substituted.

16. A process for the synthesis of an organo metallo compound wherein an acid radical of a metal salt is displaced which comprises reacting an organic metallo halide with lithium compound wherein lithium is directly linked to an alkyl group which may be further substituted.

17. A process for the synthesis of an organo metallo compound wherein an acid radical of a metal salt is displaced which comprises reacting a metal halide whose metallic radical is different from the alkali-metal radical of the other reactant with an alkali-metal compound wherein the alkali-metal is directly linked to a carbon atom in a cyclic nucleus, which may be further substituted.

18. A process for the synthesis of an organo metallo compound wherein an acid radical of a metal salt is displaced which comprises reacting a metal halide whose metallic radical is different from the alkali-metal radical of the other reactant with a lithium compound wherein the lithium is directly linked to a carbon atom in a cyclic nucleus, which may be further substituted.

HERBERT PETER AUGUSTUS GROLL.